No. 661,109. Patented Nov. 6, 1900.
A. SCHMITZ.
PROCESS OF MANUFACTURING PIPES.
(Application filed May 18, 1900.)
(No Model.)

Witnesses:

Inventor:
Albert Schmitz.
by
Attorney.

UNITED STATES PATENT OFFICE.

ALBERT SCHMITZ, OF DUSSELDORF, GERMANY.

PROCESS OF MANUFACTURING PIPES.

SPECIFICATION forming part of Letters Patent No. 661,109, dated November 6, 1900.

Application filed May 18, 1900. Serial No. 17,102. (No model.)

*To all whom it may concern:*

Be it known that I, ALBERT SCHMITZ, engineer, a citizen of the Kingdom of Prussia, and a resident of Dusseldorf, Germany, (whose post-office address is Palmenstrasse 11,) have invented certain new and useful Improvements in Processes of Manufacturing Pipes, of which the following is a specification.

My invention relates to a new and improved process for manufacturing pipes with longitudinal partitions, these pipes having been made up to this time by inserting flat iron or cross-bars or the like into a ready-made tube and welding them together.

The method of manufacturing described hereinafter is shown in the accompanying drawings.

Figure 1:
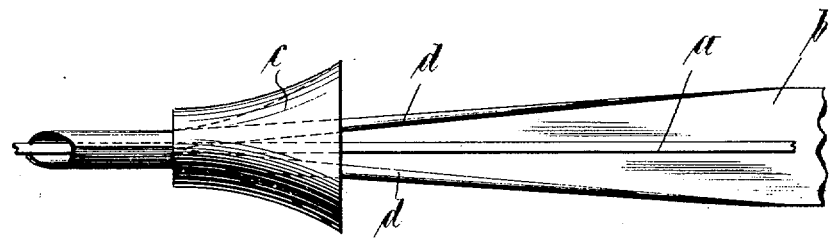

Figure 1 shows the operation of drawing seen from above. Figs. 2 to 5 show cross-cuts of some of the materials used in the process and of the tubes resulting therefrom.

Figure 2:
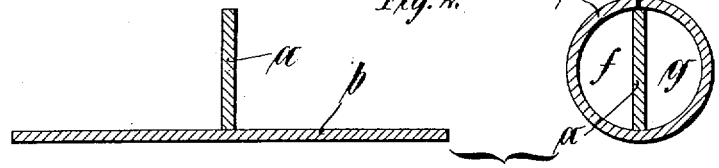

A flat iron $a$, Figs. 1 and 2, is placed on edge upon a strip $b$ of sheet metal and both are then drawn through a funnel or die $c$, the edges $d$ of the strip $b$ meeting and forming a tube, embracing the flat iron $a$. The edges of the latter are welded at the same time to the tube thus formed, and by subsequent rolling may be further united with the inner side of the tube. A tube is thus formed having two longitudinal canals $f$ and $g$, the flat iron serving as an air-tight partition-wall separating these two canals.

Figure 3:
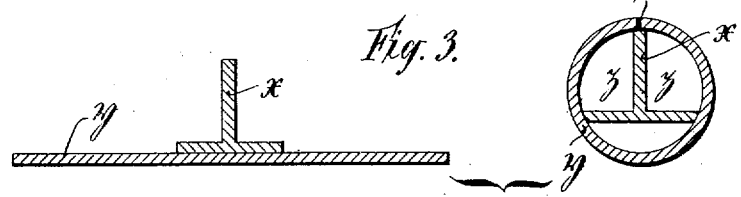
Figure 4:
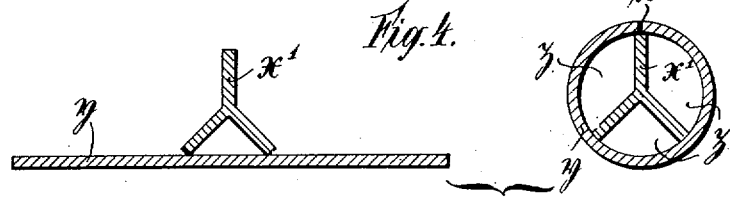
Figure 5:
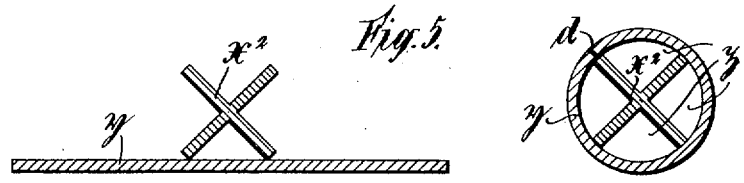

In Figs. 3 to 6 are shown further applications of this process, sheet-metal strips $y$ being drawn to form tubes around T-irons $x$, Fig. 3, star-irons $x'$, Fig. 4, or cross-bars $x^2$, Fig. 5, thus creating tubes with three or four canals $z$.

Besides those irons or bars mentioned above any other sort of profiled iron may be used to form the partitions.

The drawing may be done in a cold or heated state and may be followed by subsequent rolling.

The flat or profiled irons or bars may be twisted longitudinally before being placed upon the sheet-iron strip, thus after being drawn through the die inclosing spiral canals between themselves and the wall of the tube.

Having thus described the nature of my invention and how the same is to be performed, what I claim is—

1. The process of manufacturing pipes with longitudinal partitions, which consists in placing a profiled bar upon a sheet-metal strip and simultaneously drawing both through a die, thereby causing the strip to form a tube around the bar; substantially as shown and described.

2. The hereinbefore-described process for manufacturing pipes with longitudinal partitions by placing a previously-twisted profiled bar upon a sheet-metal strip and drawing both simultaneously through a die; substantially as, and for the purpose described.

In testimony whereof I affix my signature in presence of two witnesses.

ALBERT SCHMITZ.

Witnesses:
 WOLDEMAR HAUPT,
 HENRY HASPER.